United States Patent Office 3,702,234
Patented Nov. 7, 1972

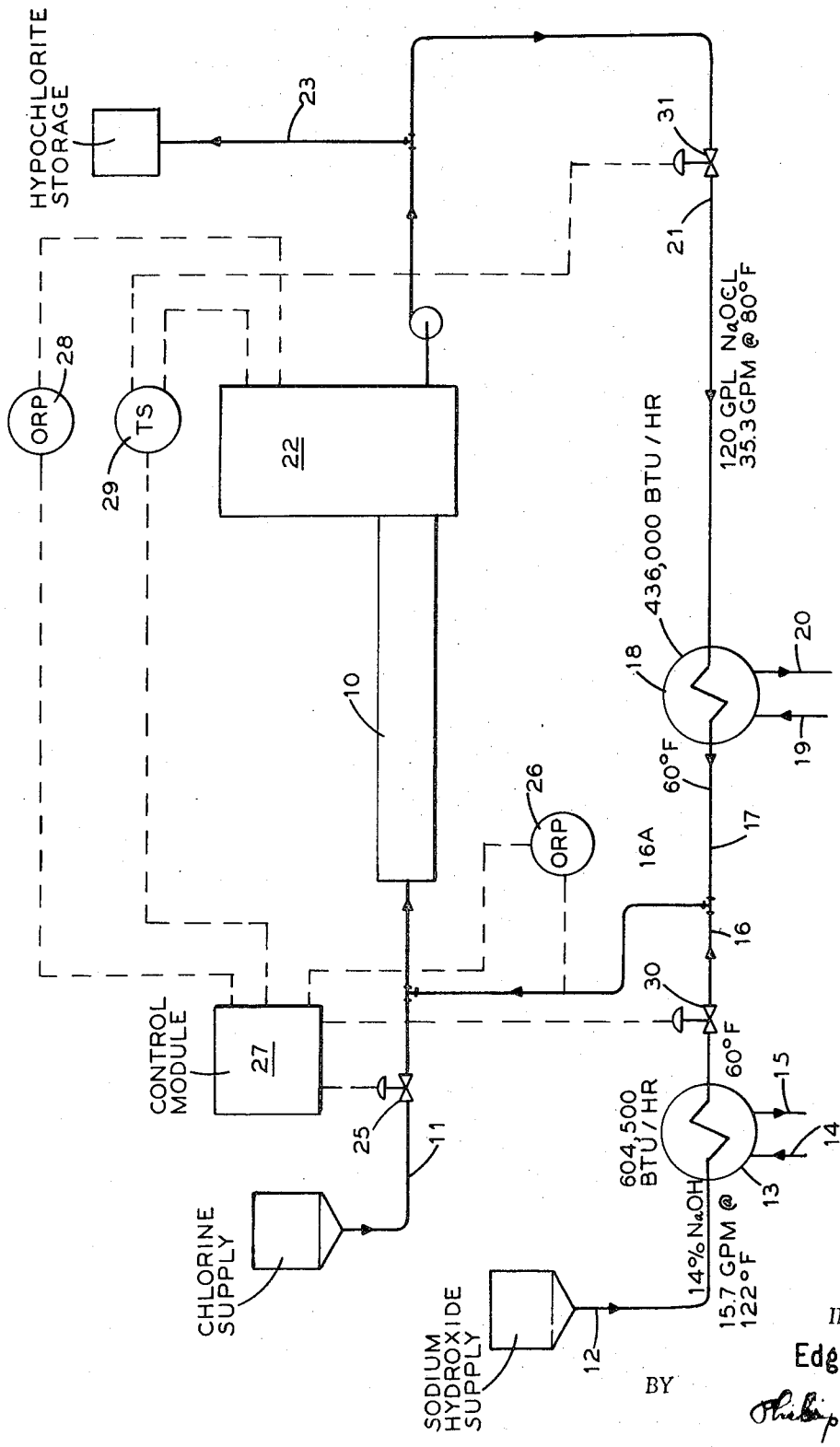

3,702,234
MANUFACTURE OF SODIUM HYPOCHLORITE
Edgar H. Pavia, 610 Poydras St.,
New Orleans, La. 70112
Filed Mar. 26, 1970, Ser. No. 22,802
Int. Cl. C01b 11/00; G01n 27/46
U.S. Cl. 23—86                                    2 Claims

ABSTRACT OF THE DISCLOSURE

A method for forming sodiuum hypochlorite at atmospheric conditions from sodium hydroxide and chlorine in proper proportions and under controlled conditions to prevent the escape of unreacted chlorine to the atmosphere; and to avoid the formation of sodium chlorate.

BACKGROUND OF THE INVENTION

In the manufacture of sodium hypochlorite, known procedures involve conditions of operation which may give rise to adverse incidents, explosion when the reactor is operated under pressurized conditions; escape of unreacted chlorine to the atmosphere; irregular operating temperatures resulting in the production of an inferior product; and control procedures which require excessive and expensive instrumentation and substantial amounts of operative manpower.

Accordingly, an object of this invention is to provide an improved method of making sodium hypochlorite involving operation under atmospheric pressures.

Another object of this invention is to provide a method of the character described, utilizing improved control procedures which are effective to increase the overall efficiency of the operation and to improve the quality of the resultant product.

A further object of this invention is to provide a method of the character described, wherein control instrumentation is of a character and arrangement such as to completely automate the operation and to materially reduce required manpower.

Yet another object of this invention is to provide a method of the character described, wherein the reaction takes place under precisely controlled cooling conditions whereby to make the reaction more efficient and the product of high quality.

Still another object of this invention is to provide a method of the character described, wherein a temperature monitoring system is responsive to temperature conditions to discontinue the supply of raw feedstock at temperatures exceeding a predetermined value, which value is lower than that necessary for the formation of sodium chlorate; and to sense temperature conditions indicative of overchlorination.

Still a further object of this invention is to provide in a method of the character described, control instrumentation including Oxidation-Reduction Potential measurement means sensing the raw feed stock supplied to the reactor, and Oxidation-Reduction Potential measurement means sensing the finished product; such measurement means being correlated in operation to produce a more uniform rate of reaction.

Another object of this invention will in part be obvious and in part hereinafter pointed out.

BRIEF DESCRIPTION OF THE DRAWING

The single figure shows a flow sheet of the method of forming sodium hypochlorite in accordance with the instant invention.

DESCRIPTION OF THE PREFERRED EMBODIMENT

Sodium hypochlorite is formed by the reaction of sodium hydroxide and chlorine. Such reaction is of an exothermic character and takes place in an extremely short time period. However, it appears that the reaction time is at least partially dependent on temperature. Such reaction results in a heat of reaction of 626 B.t.u./lb. if the chlorine is introduced in the gaseous state; and 526 B.t.u./lb. if the chlorine is introduced in the liquid state.

Care must be taken in the manufacture of sodium hyprochlorite (NaOCl) to avoid elevated temperatures which will favor the formation of sodium chlorate (NaClO$_3$). It has been established that temperatures of 86° F. or more will result in the formation of chlorate, at the expense of hypochlorite formation. While under conditions of immediate use of the freshly formed hypochlorite or where the presence of chlorate is not objectionable, temperature is not usually controlled; in accordance with the instant invention, the temperature is controlled and prevented from reaching a value at which chlorate would be formed.

Referring in detail to the drawing, which shows a flow sheet of the process embodying the invention; 10 designates a reactor where chlorine and sodium hydroxide are combined to form hypochlorite. Reactor 10 is of tubular form and of a diameter and length calculated in accordance with a selected rate of hypochlorite formation and a desired product concentration.

Chlorine is supplied to reactor 10 by way of a valved supply line 11, extending from a chlorine source, not shown, and which may take the form of expansion tanks coupled to cylinders of chlorine under high pressure, in liquid or gaseous form.

The chlorine is adapted to react with sodium hydroxide in selected proportions and at atmospheric pressure, together with suitable temperature control. The inlet end of reactor 10 may be in the form of a T, with the chlorine passing in alignment with the reactor and acting as as ejector for the sodium hydroxide passing through another leg of the T. The chlorine may be in liquid or gaseous form; and more usually is a mixture of liquid and gas.

Thus, the operation is based on a desired output rate and product concentration; which by way of example may be set at 1000 gal./hr. of hypochlorite with a concentration of 120 g.p.l. This will require 15.7 g.p.m. of 14% sodium hydroxide for reaction with 16.7 lbs./min. of chlorine. It was found that the total heat of reaction of 527,052 B.t.u./hr. could be absorbed by a mixture of 35.3 g.p.m. of finished sodium hypochlorite and 15.7 g.p.m. of sodium hydroxide, both being at a temperature of 60° F.

Accordingly, the indicated sodium hypochlorite is removed from the reactor and cooled to 60° F. and the sodium hydroxide is also cooled to such temperature; the mixture being supplied to the inlet end of reactor 10 together with the chlorine from line 11 for the reaction which produces the heat of reaction of 527,052 B.t.u./hr. and a reaction temperature of 82° F. which is at a level below that necessary to produce sodium chlorate.

It was noted that the combination of sodium hydroxide and recirculated sodium hypochlorite, seemed to extend the time of reaction of the unreacted sodium hydroxide with the chlorine, and such reaction was not instantaneous.

The sodium hydroxide, originally at 50% concentration is diluted to 14% concentration by the addition of water and passes by way of a line 12 at a temperature of 122° F. and a rate of 15.7 g.p.m. for cooling to the temperature of 60° F., by way of a heat exchanger 13 supplied with collant water by lines 14, 15.

The sodium hydroxide leaving exchanger 13 at a temperature of 60° F. is joined by a flow of recirculated sodium hypochlorite also at a temperature of 60° F. and at a rate of 35.3 g.p.m. for supply to reactor 10. Thus, the line 16 carrying the sodium hydroxide is joined by a line 17 carrying the sodium hypochlorite from a heat exchanger 18, supplied with coolant water by lines 19, 20. The sodium hypochlorite may be supplied directly from reactor 10, at a temperature of 80° F. by way of line 21, extending from an averaging tank 22 which receives the sodium hypochlorite from reactor 10.

In the averaging tank 22, the reaction product is passed over and under baffles therein, not shown. The major portion of the sodium hypochlorite at 80° F. passes from tank 22 to storage tanks, not shown, by way of line 23. Sufficient liquid is disposed in averaging tank 22 to provide a height of liquid to act as a counterbalance to the vapor pressure of any unreacted chlorine, which may reach the tank.

However, enough liquid is located over the entrance of the reacted mixture into tank 22 so that any unreacted chlorine reaching the tank will react with excess sodium hydroxide in the finished sodium hypochlorite in the tank. The completed hypochlorite is removed from the tank 22 while maintaining a determined level in said tank.

In the instant process the total heat given off by the exothermic reaction is calculated and a heat balance is worked out whereby the unreacted sodium hydroxide and a sufficient amount of finished hypochlorite is cooled to a temperature which will be effective to absorb the heat of reaction in the formation of the hypochlorite, and being short of a temperature which would induce the formation of sodium chlorate.

To this end, there is provided means for controlling the flow of chlorine to reactor 10, by way of valve 25. Thus, there is provided Oxidation-Reduction-Potential (ORP) measuring means 26 for sensing the mixture of sodium hydroxide and finished sodium hypochlorite in line 16. The output of means 26 is supplied to a control module 27 which operates valve 25.

A second Oxidation-Reduction-Potential (ORP) measuring means 28 senses the finished product and its output is also supplied to control module 27. A temperature sensing device 29 for sensing the temperature of the finished product, also is connected to control module 27. A valve 30 in the sodium hydroxide line 16 is controlled by module 27. The valve 30 is operated to be either wide open or completely shut, while valve 25 is operated to pass predetermined volumes of chlorine. The control module 27 consists of an arrangement of switches and relays which respond to the various inputs, in a manner known in the art, to provide output signals for operating the several control valves.

The ORP of the blended and cooled sodium hydroxide and hypochlorite is sensed by ORP measuring means 26 and a signal is transmitted to control module 27. If the action is in equilibrium, the signal is then transmitted to control valve 25 to operate the same to pass sufficient chlorine into reactor 10 to satisfy the demand of the unreacted sodium hydroxide in the mixture of sodium hydroxide and hypochlorite. When the reaction is completed, the ORP of the finished solution is sensed by ORP measuring means 28 and the temperature may be sensed by device 29, the signals therefrom being fed to control module 27.

If such signals are within acceptable limits preset in the control module, control of valve 25 remains with ORP measuring means 26. If the signals are not within the limits present in control module 27, the module determines which limit has been violated and acts accordingly. Thus, if the ORP of means 28 is violated and the temperature is within preset limits, the signal transmitted by module 27 to valve 25 is modified to reflect the requirement of ORP means 28 and such signal is utilized until the ORP sensed by ORP means 28 returns to acceptable limits, after which the signal to valve 25 is again changed to reflect the requirement sensed by ORP means 26.

If the temperature sensed by device 29 is not within acceptable limits, regardless of the readings of ORP means 26, 28, the control module 27 immediately acts to close valves 25 and 30, thus preventing the introduction of any additional raw feed stock into reactor 10 to increase the temperature further. However, the circulation of cooled sodium hypochloride is continued during this period to absorb excessive heat in the reactor 10. This continues until a lower preselected temperature is achieved. At this time, valve 30 is opened and the control of valve 25 is restored to the appropriate ORP means 26, 28 allowing normal procedure to resume.

Approximately 2.3 volumes of sodium hypochlorite is combined with 1 volume of unreacted sodium hydroxide of 14% concentration, to pass to the reactor 10. However, a valve 31 in line 21, and controlled by temperature sensor 29, is used to regulate the flow of sodium hypochlorite, with variations in temperature of the freshly formed sodium hypochlorite.

The temperature control feature may be operated on the basis of a preset limit of temperature or on a rate of temperature rise. The use of ORP measuring means 26, 28 in conjunction effects a modulating action on valve 25 and allows for small variations in the setting of said valve.

The temperature control system is highly effective in sensing and anticipating possible conditions of over chlorination; and thereby preventing the same from reaching uncontrollable limits. The time of control has been found to be quite rapid, and if over chlorination should occur, the flow of feedstock is stopped almost instantaneously, thus avoiding the release of large volumes of chlorine to the atmosphere.

Suitable pumps are located in the several lines to effect proper movement of sodium hydroxide and sodium hypochlorite.

I claim:

1. The method of forming sodium hypochlorite comprising precooling sodium hydroxide to about 60° F., precooling sodium hypochlorite to about 60° F., mixing the precooled sodium hydroxide and sodium hypochlorite, introducing the mixture of sodium hydroxide and sodium hypochlorite into a reactor, passing chlorine into said reactor for reaction with the sodium hydroxide of said mixture, regulating the flow of chlorine into said reactor including the steps of measuring the oxidation-reduction potential of the mixture of sodium hydroxide and sodium hypochlorite, measuring the oxidation-reduction potential of the freshly formed sodium hypochlorite, producing signals correlated to said measurements, sensing the temperature of the freshly formed sodium hypochlorite, producing a signal correlated to the sensed temperature, combining said signals to produce a control signal for controlling the regulation of the flow of chlorine.

2. Apparatus for forming sodium hypochlorite comprising reactor means, means for precooling sodium hydroxide, means for precooling sodium hypochlorite, means for introducing a mixture of the precooled sodium hydroxide and sodium hypochlorite, into said reactor means, means for passing chlorine into said reactor means for reacting with the sodium hydroxide of the mixture, means for regulating the flow of chlorine into said reactor means including means for measuring the oxidation-reduction-potential of the mixture of sodium hydroxide and sodium hypochlorite, means for measuring the oxidation-reduction potential of the freshly formed sodium hypochlorite, means for producing signals correlated to said measurements means for sensing the temperature of the freshly formed sodium hypochlorite, means for producing a signal correlated to the sensed temperature, and means for combining said signals to produce a control signal for controlling the means for regulating the flow of chlorine.

References Cited
UNITED STATES PATENTS

| | | | |
|---|---|---|---|
| 1,850,975 | 3/1932 | Baker | 23—86 |
| 2,889,199 | 6/1959 | Osborne et al. | 23—86 |
| 2,965,443 | 12/1960 | Osborne et al. | 23—86 |
| 3,051,631 | 8/1962 | Harbin, Jr. et al. | 204—1 |
| 3,199,949 | 8/1965 | Clerbois et al. | 23—86 |
| 3,241,912 | 3/1966 | Nicolaisen | 23—86 X |
| 3,287,233 | 11/1966 | Aigueperse et al. | 23—86 X |

OTHER REFERENCES

Journal of the Electrochemical Society, August 1950, pp. 245–248.

Derwent: Belgian Report No. 86A, Mar. 9, 1962, p. C7.

HOWARD S. WILLIAMS, Primary Examiner

U.S. Cl. X.R.

23—1 B, 230 A; 204—1 T, 115 R